United States Patent [19]

Inaba

[11] Patent Number: 5,685,626
[45] Date of Patent: Nov. 11, 1997

[54] STEREO SLIDE MOUNT AND MASKING-AMOUNT GUIDE DEVICE

[76] Inventor: Minuro Inaba, No. 1116, Oaza Samukawa, Oyama-shi, Tochigi-ken, Japan

[21] Appl. No.: 612,543
[22] Filed: Mar. 8, 1996
[51] Int. Cl.[6] .................................................. G03B 21/14
[52] U.S. Cl. ...................... 353/120; 353/97; 353/DIG. 5; 40/701; 40/705
[58] Field of Search .............................. 353/120, DIG. 2, 353/DIG. 5, 97; 40/701, 704, 705, 706, 707

[56] References Cited

U.S. PATENT DOCUMENTS

| | | | |
|---|---|---|---|
| 2,739,401 | 3/1956 | Balter | 353/705 |
| 2,823,478 | 2/1958 | Östergaard et al. | 353/707 |
| 3,133,368 | 5/1964 | Perrot | 353/701 |
| 3,235,991 | 2/1966 | Harper et al. | 353/707 |
| 4,431,282 | 2/1984 | Martin geb. Böser | 353/120 |
| 5,392,548 | 2/1995 | Truc et al. | 353/705 |

*Primary Examiner*—William Dowling
*Attorney, Agent, or Firm*—Fattibene and Fattibene; Paul A. Fattibene; Arthur T. Fattibene

[57] ABSTRACT

A stereo slide mount is divided into a base frame 21 and a cover frame 22 in order to facilitate the operation for mounting the stereo slide and to improve correctness. The size of the windows of the base frame is equal to the size of the pictures of the films, and pins 25 are provided at four corners of the windows to engage with perforations of the film. The cover frame 22 has holes 26 that correspond to the pins 25 and can be fitted to the base frame. The cover frames 22 are prepared in plural kinds (#0, #1, —) in which the width $C_1$ between the windows is equal to the width between the windows in the base frame, and the width W of the windows decreases stepwisely. Plural kinds of masking-amount guide devices 31 having the same size of windows as that of the cover frames and having a collimation pattern at the same position on the right and left windows, are successively and temporarily fitted to the base frame 21, and the image of the stereo slide films is observed using a stereo slide viewer. The films are mounted on the base frame by using a cover frame of the same number as the number (#) of the masking-amount guide device 31 with which the sense of distance to the subject in a close-range view is in agreement with the sense of distance to the collimation pattern 35. There is thus obtained a stereo image with the parallax being suitably corrected.

7 Claims, 13 Drawing Sheets

(PRIOR ART)
FIG. 13(a)
(PRIOR ART)
FIG. 13(b)
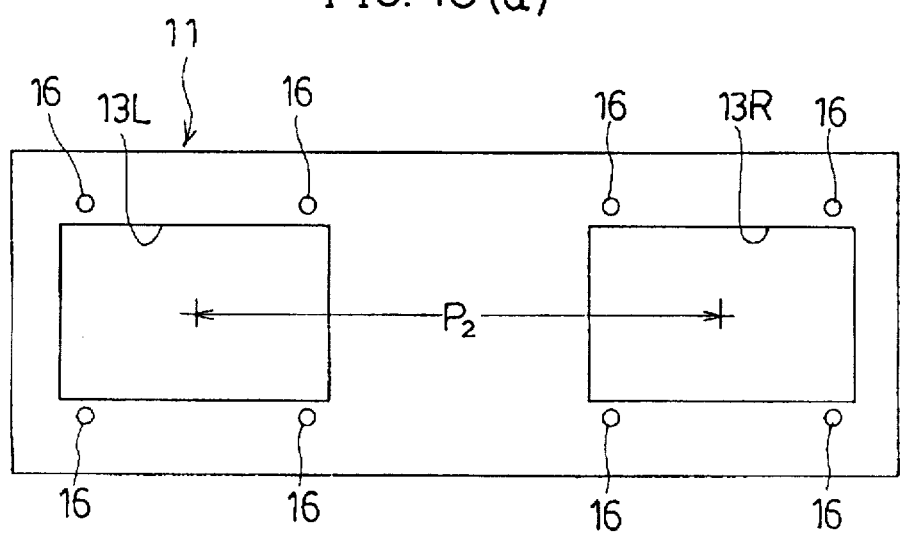
FIG. 13(c)
(PRIOR ART)
FIG. 13(d)
(PRIOR ART)
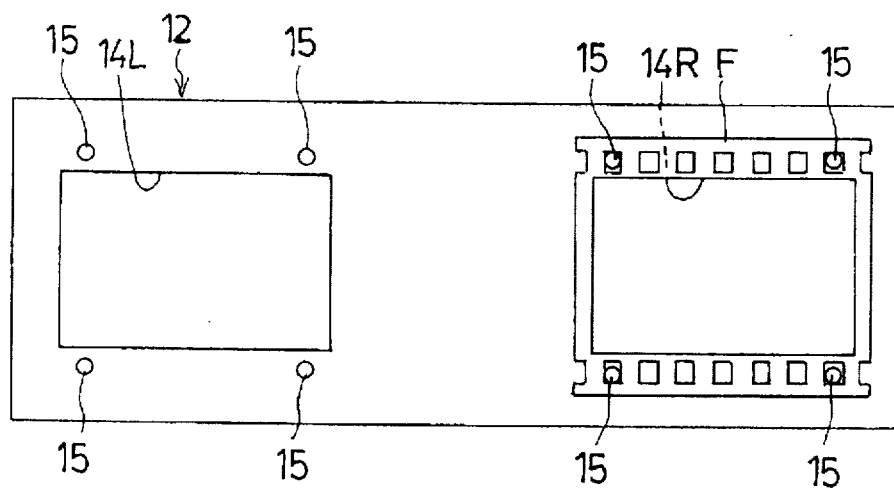
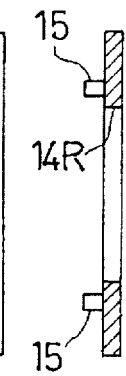

STEREO SLIDE MOUNT AND MASKING-AMOUNT GUIDE DEVICE

BACKGROUND OF THE INVENTION

The present invention relates to a stereo slide mount and a masking-amount guide device for the stereo slide mount. More specifically, the invention relates to a stereo slide mount for facilitating the mounting operation and a masking-amount guide device for the stereo slide mount.

DESCRIPTION OF THE PRIOR ART

FIG. 10 illustrates right and left pictures PR and PL photographed by using a stereo camera. The left picture PL has a left end portion A–B and the right picture PR has a right end portion C–D that are not overlapped one upon the other due to a difference in the visual field of the right and left photographing lenses of the stereo camera. These non-overlapping portions A–B and C–D do not contribute to forming a solid image when the slides are viewed by using a stereo slide viewer but, instead, the edges of the other windows appear as vertical lines along the boundaries of the overlapping portions and the non-overlapping portions when they are viewed by two eyes as shown in FIG. 11. To prevent this, therefore, the windows of the stereo slide mount have been formed in a width narrower than the size of the picture of the slide films to shield the non-overlapping portions A–B and C–D.

FIG. 12 illustrates a stereo slide mount 1 made of a paper. The upper half portion is folded toward this side along a folding line 2 located midway in the up-and-down direction, and a front-side cover frame 3 of the upper half portion and the back-side base frame 4 of the lower half portion are adhered together. Right and left windows 5R, 5L, 6R and 6L are perforated in the cover frame 3 and in the base frame 4, the windows being symmetrically disposed up and down with the folding line 2 as an axis of symmetry.

On the upper and lower portions of the windows 6L and 6R of the base frame 4 are printed reference lines 7 and 8 that serve as markers of upper and lower positions of the slide films. The left slide of a pair of stereo slides cut after each frame is positioned being fitted to the left lower window 6L and is adhered along the edge portions thereof. Similarly, the right slide is positioned being fitted to the right lower window 6R and is adhered. Thereafter, the cover frame 3 is folded and is adhered to the base frame 4.

In positioning the slide films, the right and left pitches of a subject in the closest-range view are positioned to be equal to the pitch $P_1$ of the window by using a mount gauge made of a transparent plastic board or a glass board which is marked with a pitch equal to the pitch $P_1$ between the right and left windows of the stereo slide mount 1.

In the case of photographing a subject in a long-range view such as landscape, the subject is located at the same position on the right and left pictures, and the pitch of the film and the pitch $P_1$ of the window are nearly equally adjusted. As the distance to the subject decreases, however, the subjects approach each other on the right and left pictures due to parallax of the right and left lenses. If the pitch between the right subject and left subject is set to be equal to the pitch $P_1$ of the window, therefore, the pitch of the film becomes longer than the pitch $P_1$ of the window. Therefore, there have been provided plural kinds of stereo slide mounts having non-overlapping portions on the outer sides of the right and left pictures that are shielded, having the same pitch $P_1$ between the centers of the windows and having several different widths W of windows, so that the inner edge portions of the right and left pictures will not be exposed inside the windows. The stereo slide mounts have, hence, been selectively used depending upon the distance to the subject that is photographed.

The present applicant has further proposed a stereo slide mount that was so formed that the stereo slide could be set maintaining a predetermined pitch. As shown in FIG. 13, the stereo slide mount is constituted by a cover frame 11 and a base frame 12 which are provided with windows 13L, 13R, 14L and 14R.

At four corners of the windows 14L and 14R of the base frame 12 are provided positioning pins 15 for bringing the pictures of two pieces of slide films into agreement with the windows 14L and 14R upon engagement with perforations of the slide films F that are to be fixed. Holes 16 that correspond to the positioning pins 15 are formed in the circumference of the windows 13L and 13R of the cover frame 11. The positioning pins 15 and the holes 16 are brought into engagement with each other to join the base frame 12 and the cover frame 11 together.

This stereo slide mount is adapted to a stereo camera proposed by the present applicant. In this stereo camera, relative positions between the perforation of the film F and the picture are the same for both the right and left pictures. The stereo camera further has right and left lens-shifting mechanism. A stereo photograph is taken with a parallax which is best suited for the distance to the subject by adjusting a center gap between the lenses. Therefore, if the stereo slide photographed by using this stereo camera is mounted on the above-mentioned stereo slide mount, the right and left films are fixed maintaining a predetermined pitch $P_2$, and an optimum stereo effect is obtained minimizing the loss of pictures as much as possible.

The stereo slide mount of the type of a fixed film pitch shown in FIG. 13 makes it possible to simplify the cumbersome operation required by the conventional stereo slide mount and to eliminate the probability of incorrectly selecting the pitch for mounting the stereo slides. There, however, still remains the necessity of adjusting the parallax depending upon the distance to the subject at the time of taking a photograph. When a stereo slide photographed by using a general stereo camera without having a lens-shifting mechanism is mounted on the above-mentioned stereo slide mount of the type of a fixed film pitch, therefore, the non-overlapping portions on the outer sides of the right and left pictures may turn out to be offensive appearance.

In order to easily mount the stereo slide without the need of adjusting the pitch irrespective of whether the stereo camera is equipped with a mechanism for adjusting the distance between the lenses and to correctly obtain stereo effect, it becomes necessary to solve a technical assignment. The object of the present invention is to solve this technical assignment.

SUMMARY OF THE INVENTION

The present invention was proposed in order to accomplish the above-mentioned object and provides a stereo slide mount for mounting a stereo slide photographed by using a stereo camera which has the same relative positions of a pair of right and left photographed pictures as those of perforations of a perforated film, wherein said stereo slide mount is constituted by a base frame and a cover frame having two rectangular windows arranged in parallel, respectively, positioning pins are provided on the film-mounting surface of said base film to bring the pictures of two pieces of slide films into agreement with the windows upon engagement with perforations of the slide films that are to be fixed, holes corresponding to said positioning pins are formed in the film-holding surface of said cover frame, and said positioning pins are fitted to said holes in order to join said base frame and said cover frame together, and wherein plural kinds of cover frames are prepared in which the width between the right window and the left window in said cover frames is the same as the width between the windows in said base frame but the width of the windows gradually decreases relative to the width of pictures of the films, and said cover frame is selected and is joined to the base frame, making it possible to adjust the shielding areas on the right and left outer sides of the stereo slide films.

The invention provides a stereo slide mount wherein plural kinds of framing masks are prepared having a rectangular window at the center thereof, having a shape corresponding to a frame of the slide film, having engaging holes that engage with the positioning pins of said base frame, having a positional relationship between said engaging holes and a vertical side of the window which is the same as a positional relationship between the perforation and a vertical side on the inside of the picture of the stereo slide film, and having a width of window which becomes gradually smaller than the width of the picture of the slide film, and wherein said framing mask is selected and is overlapped on the slide films on said base frame, and the cover frame is fitted to the base frame, making it possible to adjust the shielding areas on the right and left outer sides of the stereo slide films.

The invention further provides a stereo slide mount wherein said cover frame is provided with a hinge portion at the center between the right and the left so that it can be freely folded.

The invention provides a masking-amount guide device for the stereo slide mount, wherein transparent films or transparent glasses are stuck to the windows of the plural kinds of frames that have the same shapes as the cover frames and have the plural kinds of window widths, and the same collimation pattern is printed at the same position of the right and left windows.

The invention provides a masking-amount guide device for the stereo slide mount, wherein said collimation pattern consists of a plurality of vertical lines or includes a plurality of vertical lines.

The invention further provides a masking-amount guide device for the stereo slide mount, which is a stereo slide viewer having right and left two optical systems consisting of projection lenses, focusing plates, erect prisms for reversing an inverted image and eyepieces, wherein the same collimation pattern is printed at the same position of the right and left focusing plates, provision is made of a mechanism for adjusting the projection magnification of image on said focusing plates, a mechanism for adjusting the distance between said focusing plates, and an interlocking mechanism for coupling said projection magnification-adjusting mechanism to said distance-adjusting mechanism, and wherein the outer edges of the right and left focusing plates are brought into agreement with the outer edges of the projected pictures by said interlocking mechanism irrespective of the projection magnification factor, and relative positions between the collimation pattern and the projected pictures is changed being interlocked to the projection magnification factor.

The invention further provides a masking-amount guide device for the stereo slide mount, wherein the collimation pattern of said focusing plates consists of a plurality of vertical lines or includes a plurality of vertical lines.

BRIEF DESCRIPTION OF THE DRAWINGS

FIG. 1 illustrates a stereo slide mount of claim 1, wherein

FIG. 13 is a diagram illustrating a conventional stereo slide mount of the type of a predetermined pitch, wherein FIG. 13(a) is a front view of a cover frame, FIG. 13(b) is a sectional view of FIG. 13(a), FIG. 13(c) is a front view of a base frame, and FIG. 13(d) is a sectional view of FIG. 13(c).

DESCRIPTION OF THE PREFERRED EMBODIMENTS

Figure 1A:
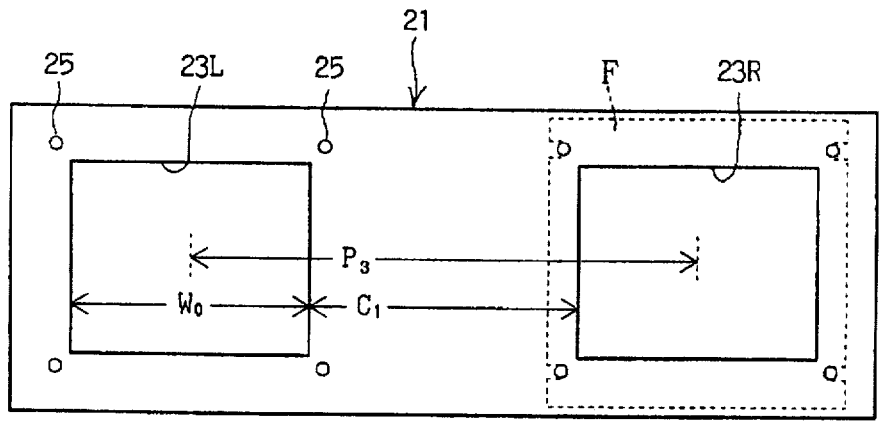
FIG. 1(a) is a front view of a base frame.
Figure 1B:
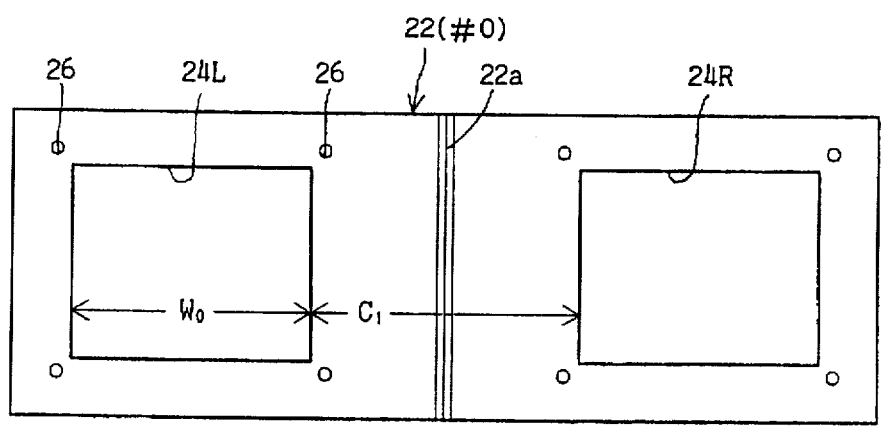
FIGS. 1(b), 1(c) and 1(d) are back views of a cover frame.
Figure 1C:
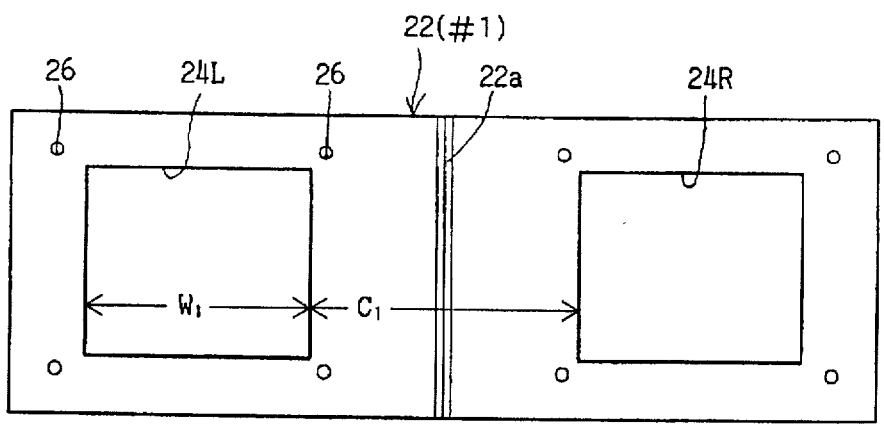
Figure 1D:
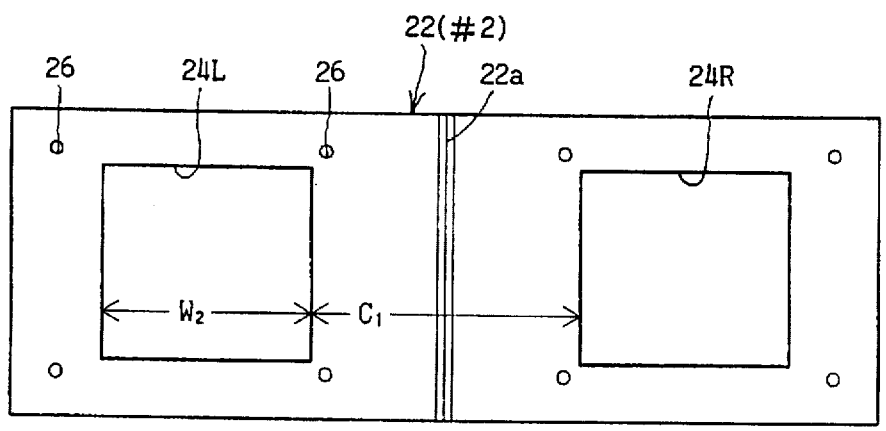

Embodiments of the present invention will now be described in detail with reference to FIGS. 1 to 9. FIG. 1 illustrates a stereo slide mount of claim 1 having a fundamental constitution which is the same as that of a stereo slide mount shown in FIG. 13. The stereo slide mount is constituted by a base frame 21 of (a) and a cover 22 of (b), (c) and (d) formed by injection-molding a resin, and are provided with right and left windows 23R, 23L, 24R and 24L, respectively. The pitch $P_3$ between the right window 23R and left window 23L in the base frame 21 is set to be about 63.5 mm which is nearly equal to the pitch between the two human eyes. The windows 23R and 23L have vertical and lateral sizes which are the same as, or slightly greater than, the size of the picture of the slide films F, so that the whole picture of the films F can be seen.

On the base frame 21 are studded cylindrical pins 25 at four symmetrical places at upper and lower positions on the right and left sides of the window. In the cover frame 22 are provided holes 26 at positions corresponding to the positioning pins 25.

The positional relationship of the positioning pins 25 and windows 23R, 23L is the same as the positional relationship of the picture and perforations in a stereo camera which is so constituted that relative positions of perforations and picture of the film F remains the same between right and left at all times. By bringing the upper, lower, right and left perforations of a slide film F cut after every frame into engagement with the positioning pins 25 at four places, therefore, the centers of the window 23R and 23L are brought into agreement with the centers of the pictures of the slide films F.

The cover frames 22 are provided in plural kinds (#1, #2, #3, —) starting from the one in which the distance between the right and left windows 24R and 24L and the width of the windows are equal to the distance $C_1$ between the windows and the width $W_0$ of the base frame 21 (#0) through up to those in which the distance $C_1$ between the windows is the same but the width W of the windows stepwisely decrease (#1, #2, #3, —) (in practice, though the width of windows changes very little from one step to another, the diagrams of FIG. 1 show it in an exaggerated manner). It is therefore made possible to form a stereo slide having shielding areas that meet the distance to the subject to be photographed by stepwisely changing the shielding areas on the right and left outer sides of the stereo slide relying upon the number of the cover frame 22 that is joined to the base frame 21.

Figure 2:
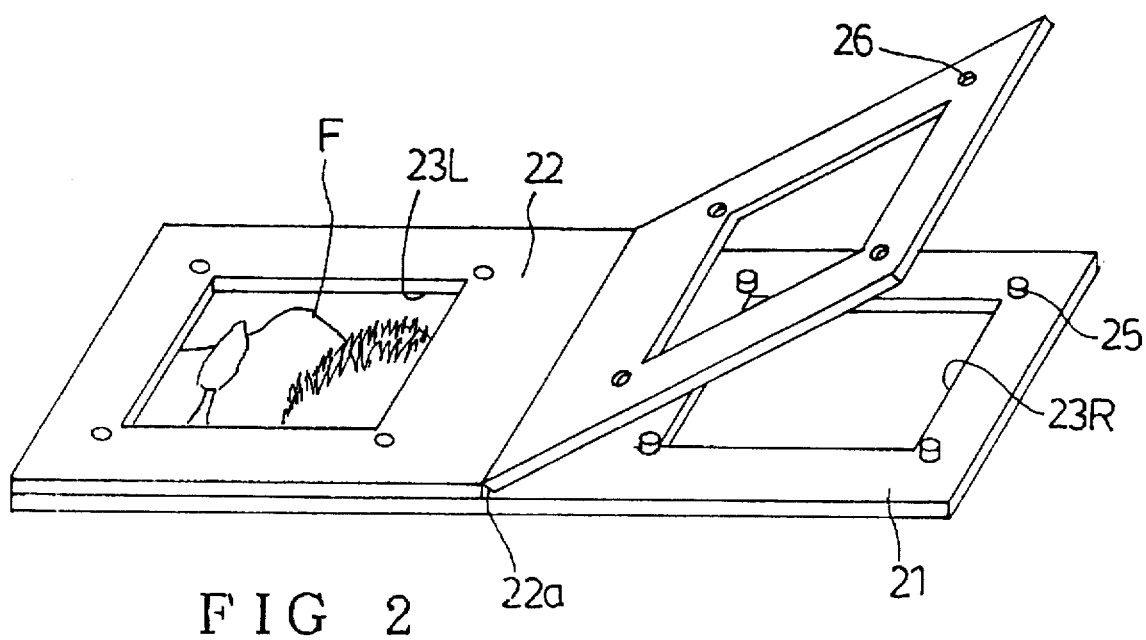
FIG. 2 is a diagram explaining how to assemble a stereo slide mount of claims 1 and 3.
Figure 3A:
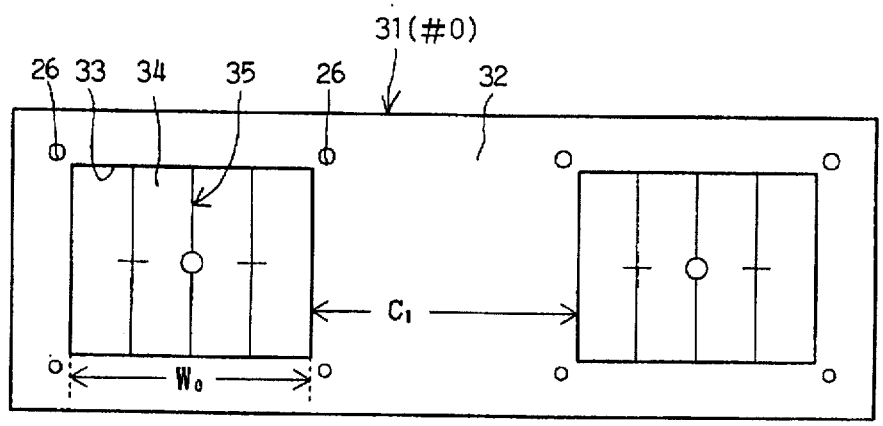
FIGS. 3(a), 3(b), 3(c) and 3(d) are front views of a masking-amount guide device of claims 4 and 5.
Figure 3B:
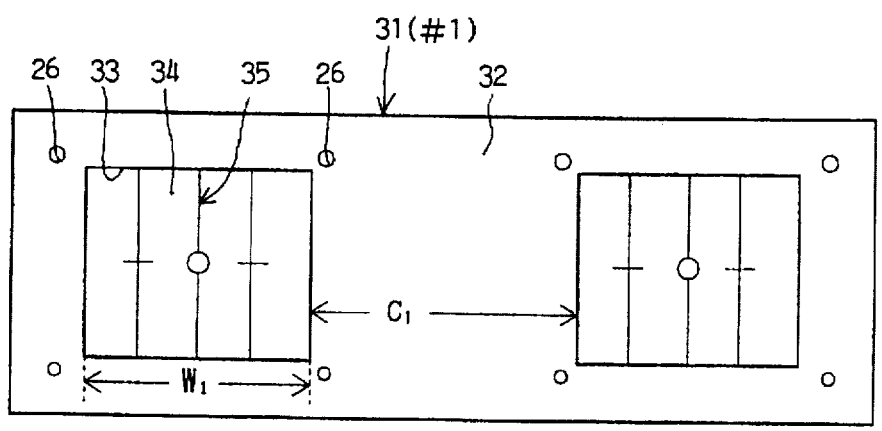
Figure 3C:
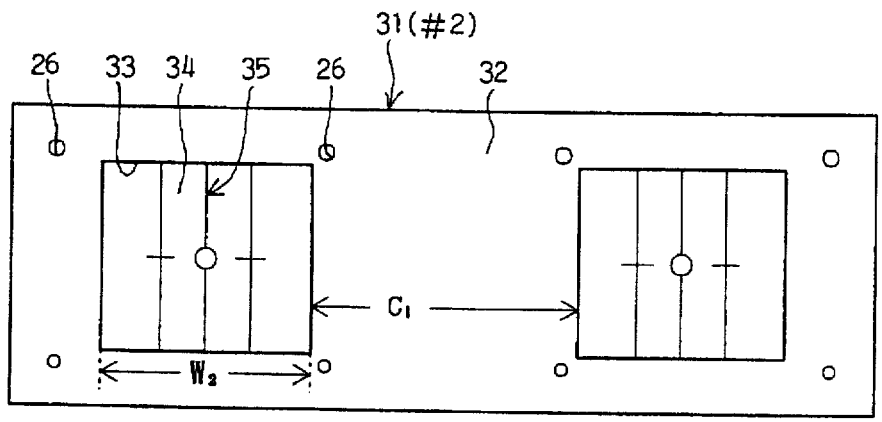
Figure 3D:
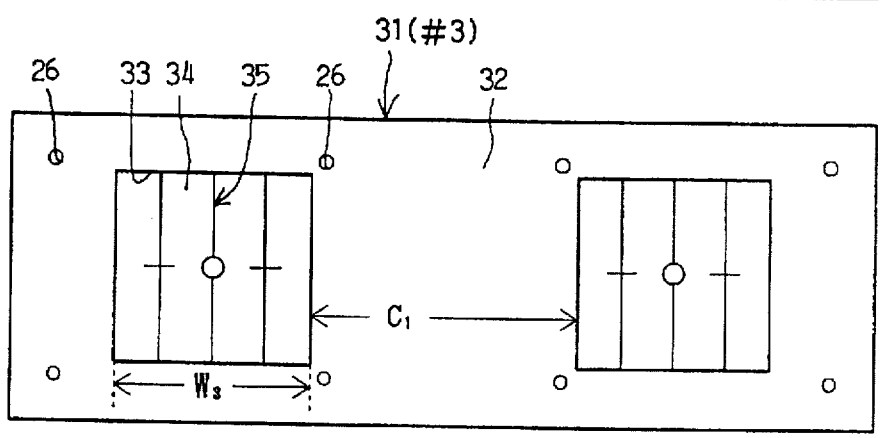

A thin hinge portion 22a is formed in a vertical direction at the center between the right and the left of the cover frame 22, so that the cover frame 22 can be folded at the center. Referring to FIG. 2, the left-side film F of the stereo slide is fitted to the left window 23L of the base frame 21, the left portion of the cover frame 22 folded at the center is overlapped such that the positioning pins 25 and the holes 26 are fitted to each other. Then, the right-side slide is fitted to the right window 23R of the base frame 21, and the right portion of the cover frame 22 is overlapped and fitted, so that the base frame 21 and the cover frame 22 are joined together.

In mounting the stereo slide, use of a masking-amount guide device of claim 4 makes it possible to objectively select an optimum cover frame 22. Referring to FIG. 3, the masking-amount guide device 31 is constituted by sticking a transparent film 34 to the windows 33 of the frames 32 (#0, #1, #2, #3, —) having the same shape corresponding to plural kinds of cover frames 22 (#0, #1, #2, #3, —) having different widths of windows, the right and left transparent films 34 having the same collimation pattern printed or developed at the same position. The collimation pattern 35 is constituted by a vertical line running through the center of the picture and vertical lines on the right and left sides thereof irrespective of the width ($W_0$, $W_1$, $W_2$, $W_3$, —) of the window 33. Though the collimation pattern includes an auxiliary pattern such as circle and lateral lines at the center of the picture, there is no particular limitation in the number of vertical lines, presence of auxiliary patterns or in their shapes.

Figure 4A:
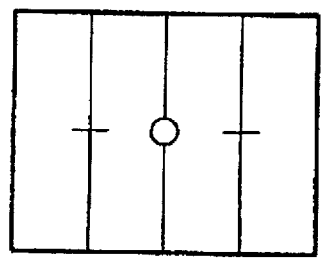
FIGS. 4(a) and 4(b) are diagrams illustrating images of the masking-amount guide device of FIG. 3 as viewed by two eyes.
Figure 4B:
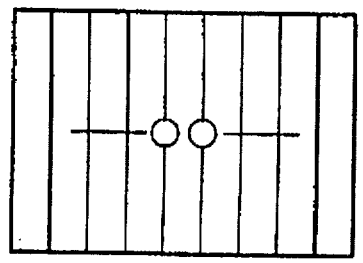
Figure 5A:
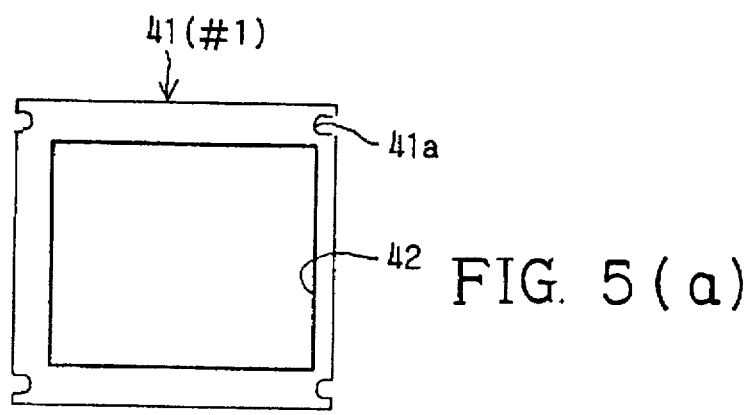
FIGS. 5(a), 5(b), 5(c) and 5(d) are front views of a framing mask for the stereo slide mount of claim 2.
Figure 5B:
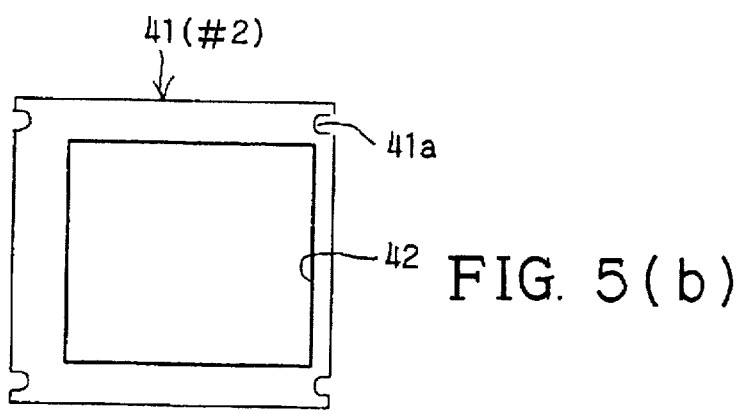
Figure 5C:
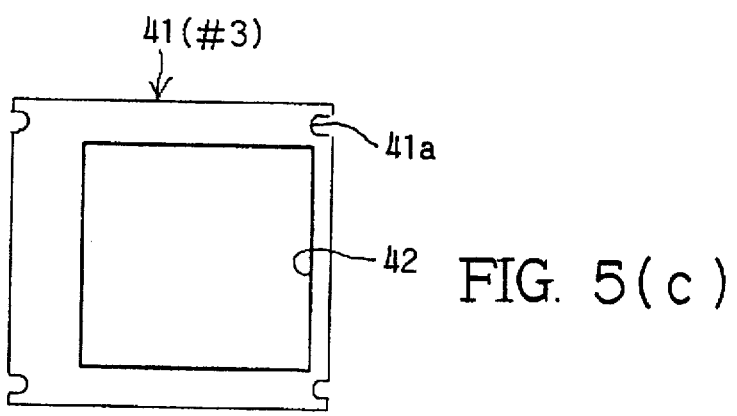
Figure 5D:
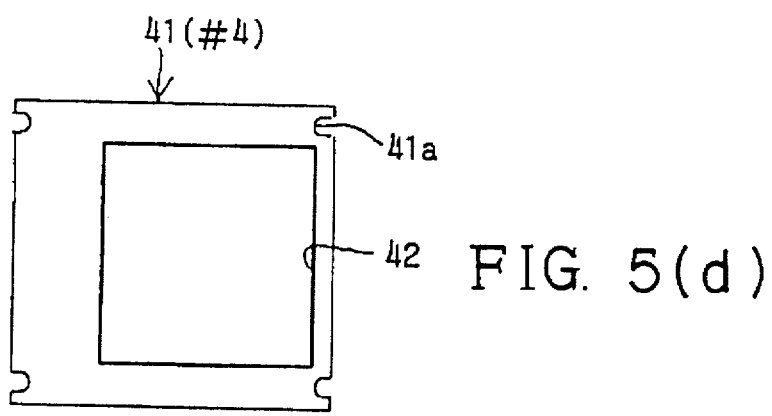
Figure 6:
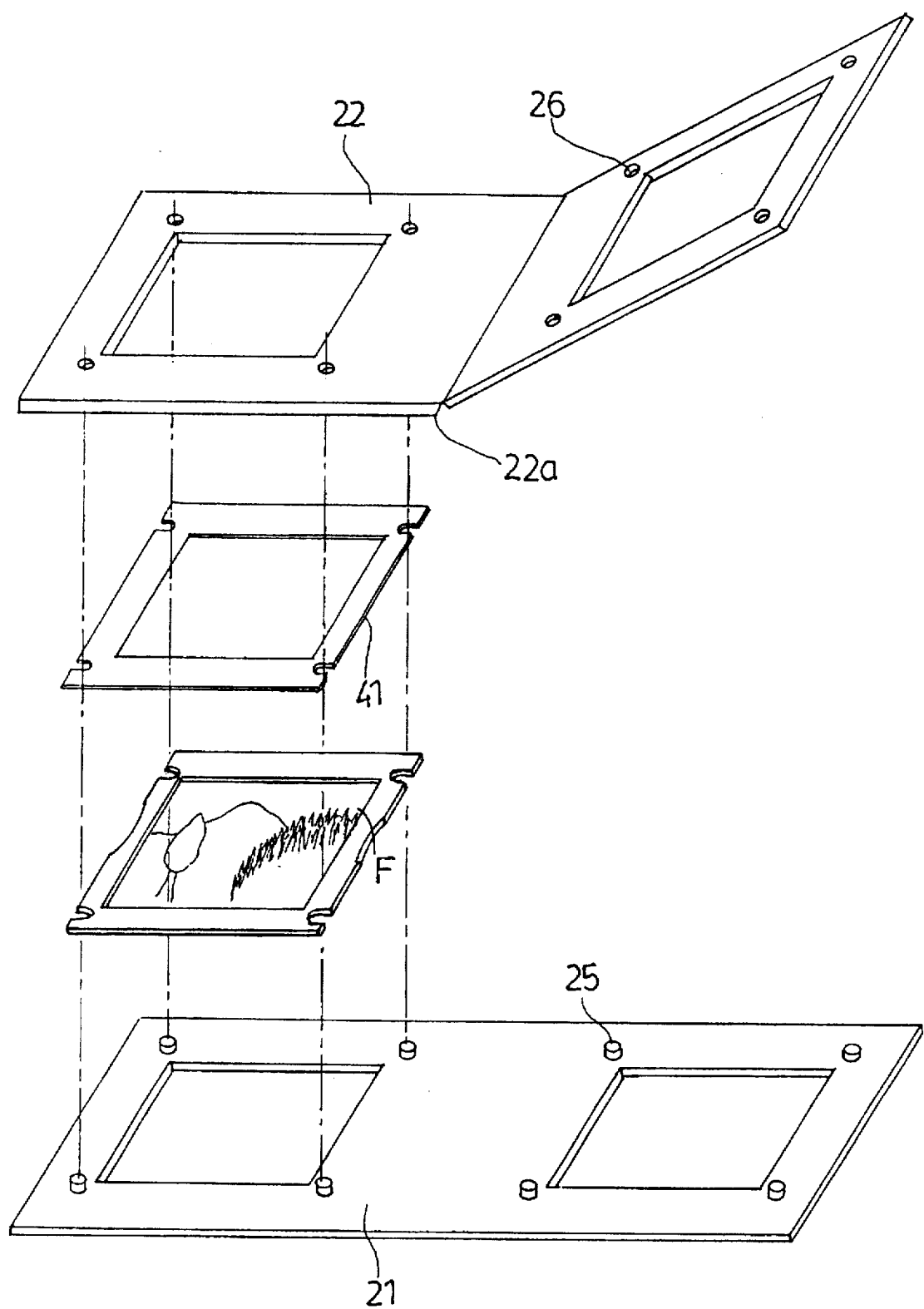
FIG. 6 is a diagram explaining how to assemble the stereo slide mount of claim 2.

When the masking-amount guide device 31 (#0, #1, #2, #3—) is watched by itself or being temporarily fitted to the base frame 21 using the stereo slide viewer, the axes of vision are so adjusted by the viewer's action of sight that the right and left collimation patterns 35 are in agreement with each other, and appear as shown in FIG. 4(a) irrespective of the masking-amount guide device 31 of which number is used. However, when the stereo slide photographing a subject in a close-range view is mounted on the base frame 21 and the subject is viewed by overlapping the masking-amount guide device 31 of #0 thereon, the right and left collimation patterns 35 appear being deviated from each other as shown in FIG. 4(b) due to parallax between the subject and the collimation pattern 35. In such a case, the masking-amount guide device 31 is successively changed into the one having a larger number. When the masking-amount guide device having a suitable width of window is fitted, the subject as well as the right and left collimation patterns 35 appear in agreement as shown in FIG. 4(a), and distances to the collimation pattern 35 and to the subject appear to be the same.

As the masking-amount guide device is changed into the one having a narrower width of windows, the whole subject appears being located at the back of the collimation pattern 35. The stereo slide adjusted to this step can be seen most easily. Whether the cover frame 22 of this number or preceding number be used is determined depending upon the viewer's liking.

After the number of the cover frame 22 is determined, the masking-amount guide device 31 is removed from the base frame 21, and the cover frame 22 of a number that is determined is fitted to the base frame 21 to complete the mounting operation.

FIG. 5 illustrates a framing mask 41 of the stereo slide mount of claim 2 which is obtained by perforating a window in a light-shielding material such as paper or film of black resin, and has semi-circular notches 41a corresponding to perforations of the slide film at four upper, lower, right and left portions. Like the above-mentioned cover frames 22, the framing masks 41 have been prepared in plural kinds (#1, #2, #3, —) having stepwisely changing widths of windows.

The relative positions of one vertical side of the window 42 of the framing mask 41 and of semi-circular notches 41a are the same as the positions of vertical sides of pictures and perforations of the slide films.

To mask the picture using the framing mask 41, the number of the framing mask 41 to be used is determined by using the above-mentioned masking-amount guide device 31, and the framing mask 41 is so positioned that the outer side of the left slide film F on the base frame 21 is shielded and is overlapped on the slide film F. The cover frame 22 of #0 is then fitted to the base frame 21; i.e., the slide film F and the framing mask 41 are held being laminated one upon the other. Then, the right slide film F is shielded on its outer side by the framing mask 41 in the same manner as described above, and the cover frame 22 is fitted to the base frame 21 to assemble the stereo slide mount.

Figure 7:
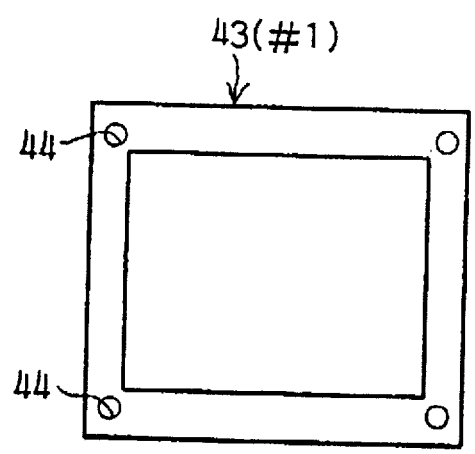
FIG. 7 is a front view of the framing mask of FIG. 5 according to another embodiment.

When the framing mask 41 is used, only one kind of cover frame 22 (#0) having the largest width of windows may be prepared, and there is no need to prepare plural kinds of cover frames, as a matter of course. FIG. 7 illustrates the framing mask according to another embodiment wherein circular holes 44 are formed at four corners of a framing mask 43 as means that engage with positioning pins 25 of the base frame 21.

Figure 8:
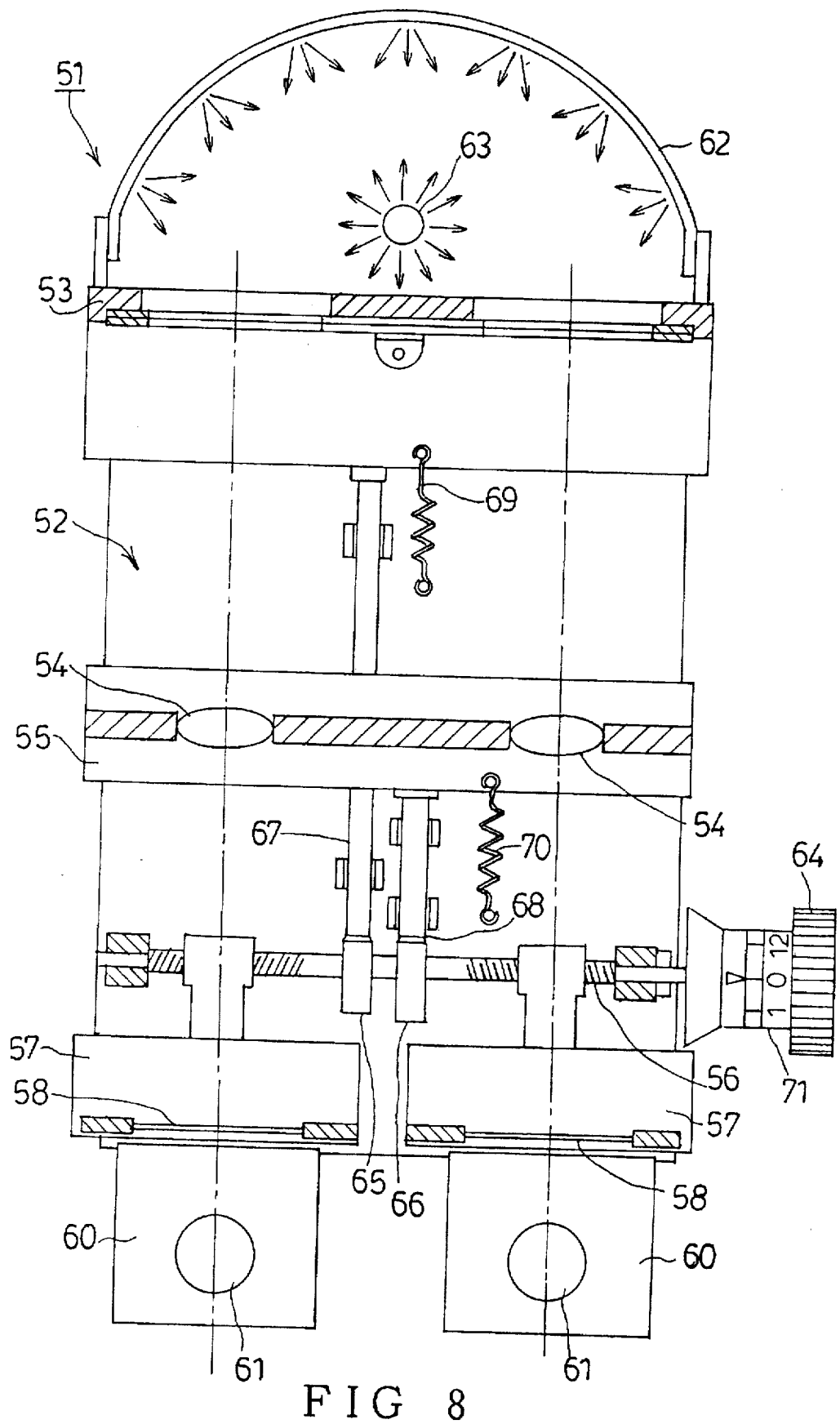
FIG. 8 is a front view of the masking-amount guide device of claim 6.
Figure 9:
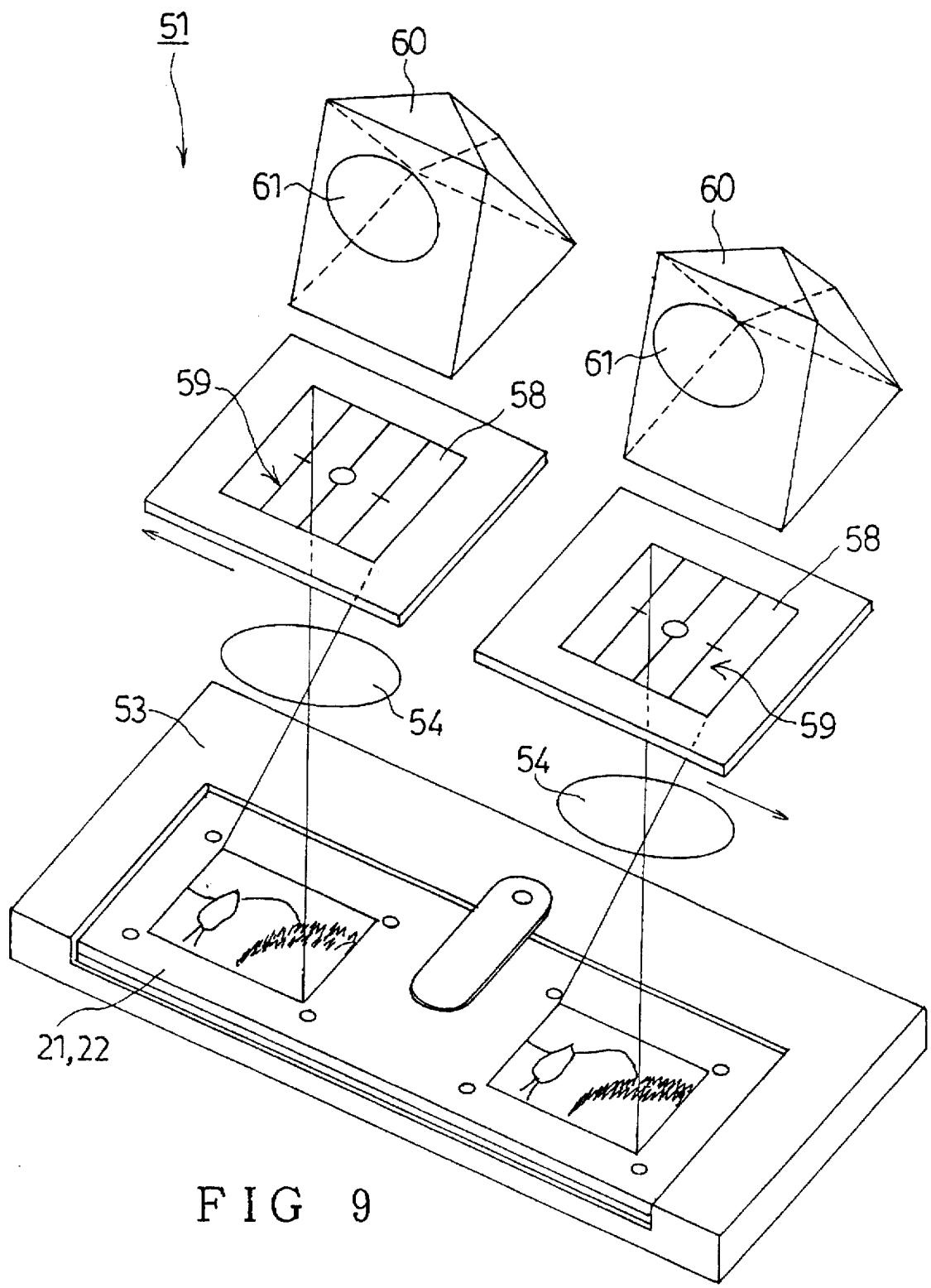
FIG. 9 is a diagram illustrating the constitution of the masking-amount guide device of claims 6 and 7.
Figure 10A:
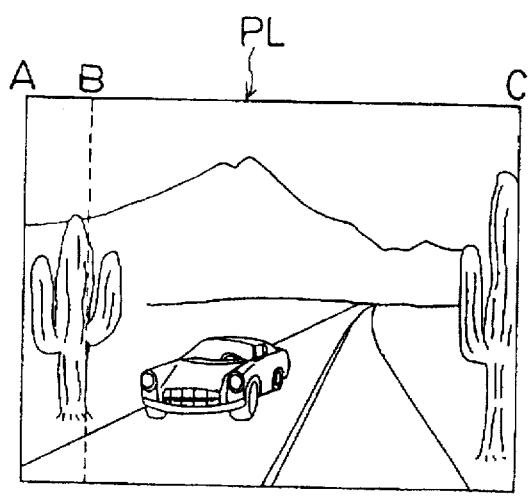
FIG. 10 is a diagram illustrating the right and left pictures of the stereo slide.
Figure 10B:
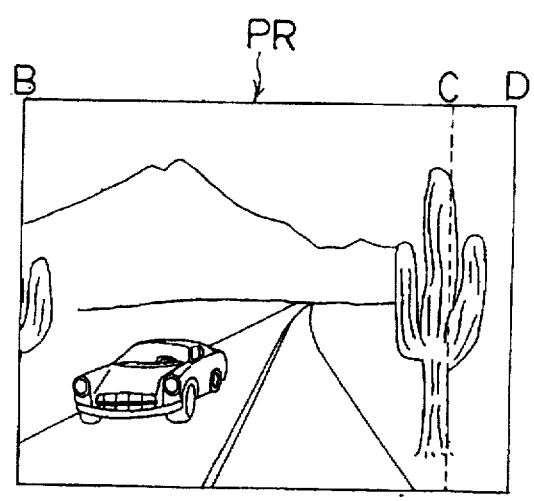
Figure 11:
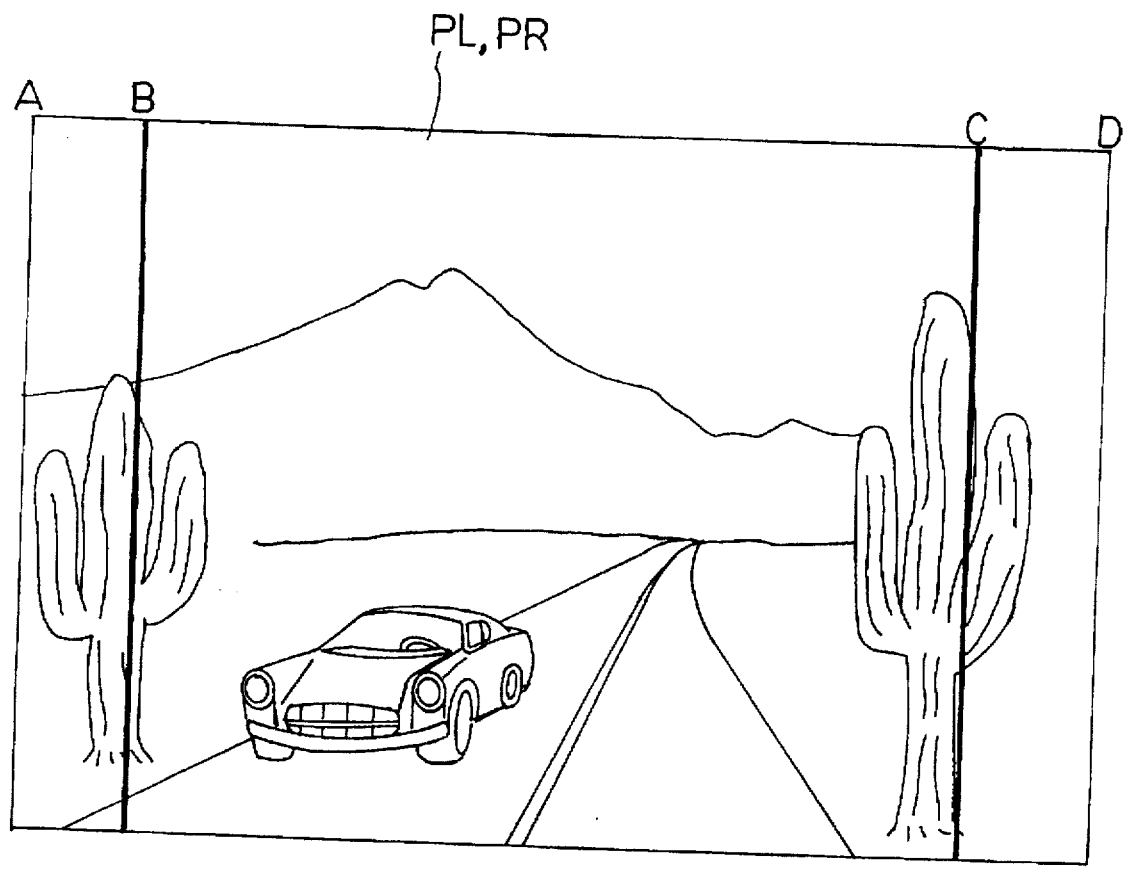
FIG. 11 is a diagram of a stereoscopic picture of the stereo slide.
Figure 12:
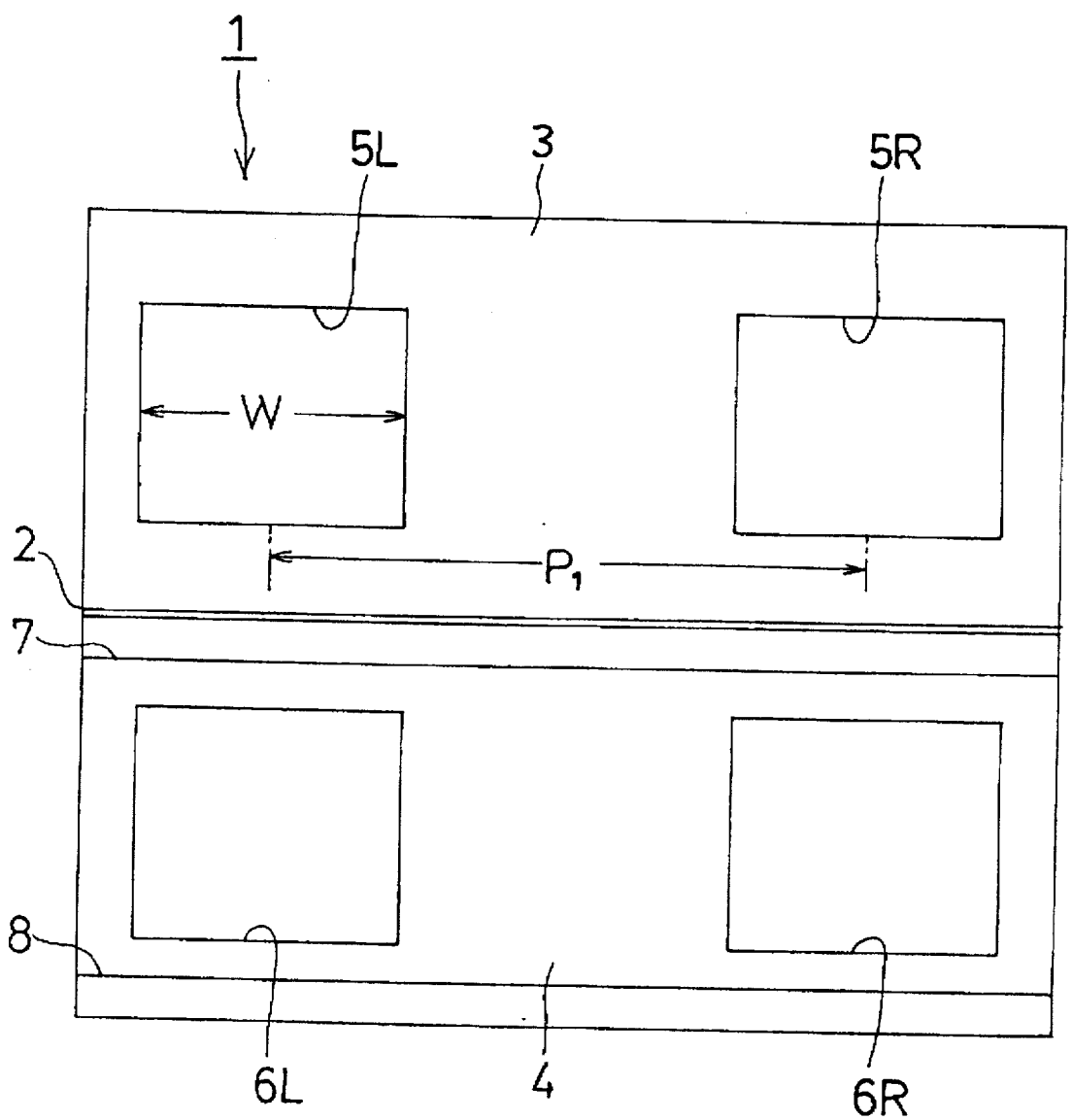
FIG. 12 is a front expansion plan of a conventional stereo slide mount.

FIGS. 8 and 9 illustrate a masking-amount guide device 51 of claim 6. Referring to FIG. 8, a stereo slide holder 53 and a lens holder 55 holding a pair of right and left projection lenses 54 are mounted on a slide guide table 52 in a manner to move back and forth. A pair of right and left focusing plate holders 57 are attached to a feed screw 56 that extends in the right-and-left direction on the front side of the lens holder 55. On the focusing plate 58 mounted on the focusing plate holder 57 are provided a collimation pattern 59 consisting chiefly of vertical lines like that of the masking-amount guide device 31 (#0) shown in FIG. 3(a).

Referring to FIG. 8, erect prisms 60 are secured to the front end portions of the slide guide table 52 being opposed to the focusing plate holders 57, and eyepieces 61 are fitted to the erect prisms 60. A semi-circular reflector 62 is fitted to the rear end of the slide guide table 52, and a bulb 63 for illumination is disposed in internal space thereof to uniformly illuminate the back surface of the stereo slide mount on the stereo slide holder 53. The right and left optical axes passing through centers of pictures of the stereo slide mount loaded on the stereo slide holder 53 and through the projection lenses 54 and erect prisms 60, are set in parallel to be equal to an infinitely remote parallax. The stereo slide holder 53 and the lens holder 55 are allowed to slide in the direction of optical axes.

The feed screw 56 for moving the focusing plate holders 57 has a left hand screw on the left side and a right hand screw on the right side. By turning an adjust knob 64 attached to an end of the feed screw 56, the right and left focusing plate holders 57 separate away from each other, or approach close to each other in a direction at right angles with the optical axes, making it possible to adjust the distance within a predetermined range in a direction from a position at which the centers of the focusing plates 58 are in agreement with the optical axes toward a direction in which the centers of the focusing plates 58 move outward.

Two pieces of cam plates 65 and 66 are fitted to an intermediate portion of the feed screw 56 to move the stereo slide holder 53 and the lens holder 55 in the back-and-forth direction separately from each other. To the stereo slide holder 53 and the lens holder 55 are attached driven tappet rods 67 and 68 that protrude toward the cam plates 65 and 66. The driven tappet rods 67 and 68 are urged onto the cam plates 65 and 66 being energized by tension springs 69 and 70. By turning the adjust knob 64 of the feed screw 56, therefore, the stereo slide holder 53 and the lens holder 55 move being interlocked to the turn of the cam plates 65 and 66, i.e., move back and forth over a range of from the most front position of an image magnification of 1:1 to a rear position of enlarged projection. The two cam plates 65 and 66 have been formed in such a shape that the projected images on the focusing plates 58 are maintained in a focused state at all times over the range of motion of the stereo slide holder 53 and the lens holder 55.

As the stereo slide holder 53 and the lens holder 55 are moved in a direction for expanding the projected picture, the focusing plate holder 57 moves being interlocked thereto to increase the distance, and the inner sides of the projected picture are masked by the picture frames of the focusing plates 58. The inverted images on the focusing plates 58 are reversed up-side down and right-side left by the erect prisms 60. Therefore, the picture watched through the eyepieces 61 of the erect prisms 60 is masked on the right and left outer sides.

Here, it is presumed that the real picture width of the stereo slide and the real picture width of the focusing plates 58 are each 30 mm. Then, when the picture of the slide is projected being enlarged to, for example, 30/29, the width of the projected picture becomes 30×30/29=31.034 mm. The difference from the width of 30 mm of the picture of the focusing plates 58 becomes 31.034−30=1.034 mm. Accordingly, when the focusing plates 58 are at the initial position shown in FIG. 8, the enlarged picture that is projected outwardly exceeds toward the right and left outer sides of the focusing plates 58 by 1.034/2=0.517 mm.

In this masking-amount guide device 51, the pitch of the feed screw 56 is so set that the right and left focusing plate holders 57 are outwardly shifted by 0.517 mm, respectively, at the time of magnified projection of 30/29. Then, the reversed image seen through the erect prisms 60 is such that the inner vertical side of the picture region of the focusing plates 58 is in agreement with the inner vertical side of the slide-projected picture on the right and left. The projected picture that has outwardly exceeded beyond the picture of the focusing plates 58, is masked. The shielding factor is the same as that of when, among the masking-amount guide devices 31 shown in FIG. 3, the one having the width of windows of 29 mm is fitted to the base frame 21 to mask the outer sides of the film pictures by 1 mm, and the stereo slide mount is viewed using the stereo slide viewer.

Thus, the inner edge of the focusing plates 58 appear to be in agreement with the inner edge of the slide-projected picture irrespective of the magnification of projection, and the shielding area on the outer side of the picture can be continuously changed. As the magnification of projection increases, the collimation pattern moves inwardly relative to the right and left projected picture, and a sense of distance to the collimation pattern and to the stereoscopic image changes like the case of when the masking-amount guide device 31 shown in FIG. 3 is successively replaced by the ones having smaller width of windows.

Referring to FIG. 8, a dial 71 of the adjust knob 64 of the feed screw 56 bears at the rotary positions the numerical figures of picture shielding factors that correspond to the numbers (#0, #1, #2, #3, —) of the cover frames 22. Therefore, the adjust knob 64 is turned while viewing the stereoscopic image through the eyepieces 61 of the erect prisms 60, and the numeral on the dial 71 is watched when the subject in a close-range view is seen at a position nearly equal to the collimation pattern 59 on the focusing plates 58 or is seen at the back of the collimation pattern 59. The number of a suitable cover frame 22 or a framing mask 41 can be thus confirmed.

As the mechanism for linking the stereo slide holder 53, lens holder 55 and focusing plate holder 57 together, there may be employed, instead of the manually operated mechanism that is shown, a mechanism by which the moving parts are driven by servo motors and are controlled by feedback using a position control unit by providing electric, magnetic or optical position sensors at the moving portions. Moreover, constitution of each of the portions can be modified in a variety of ways within technical scope of the present invention, and the present invention covers such modified embodiments, as a matter of course.

According to the stereo slide mount of the present invention as described above, the stereo slide is set to a predetermined position on the base frame and the cover frame is fitted thereto to complete the mounting operation. No operation is needed for positioning or adhering the stereo slide, and the mounting operation is very simplified.

With the cover frame being folded at the center between right and left, furthermore, the operation for mounting the stereo slide is very facilitated.

Moreover, the masking-amount guide device of the present invention makes it possible to objectively recognize the amount of masking the picture for obtaining the greatest stereo effect irrespective of stereo slides that are photographed using any type of stereo camera. With the cover frame or the framing mask of a corresponding masking amount being mounted, it is made possible to correct parallax of the subject and to minimize the loss of picture.

By constituting the collimation pattern of the masking-amount guide device using vertical lines, furthermore, the difference in the distance to the right and left pictures and to the collimation patterns can be distinctly recognized, and the number of the cover frame can be selected very easily.

As described above, the stereo slide mount and the masking-amount guide device of the present invention eliminate complexity and incorrectness involved in the conventional operation for mounting the stereo slide, make it possible to obtain visual effect of stereoscopic photographs to a sufficient degree and contribute to spreading and promoting the use of stereoscopic photographs.

I claim:

1. A stereo slide mount for mounting a stereo slide film photographed by using a stereo camera said stereo slide mount comprising a base frame having two rectangular windows arranged in parallel and a plurality of cover frames each having two rectangular windows arranged in parallel, positioning pins provided on the film-mounting surface of said base frame to bring the pictures of two pieces of slide films into agreement with the windows upon engagement with perforations of the slide films that are to be fixed, holes corresponding to said positioning pins are formed in the film-holding surface of said plurality of cover frames, and said positioning pins are fitted to said holes in order to join said base frame and one of said plurality of cover frames together, and wherein said plurality of cover frames are prepared wherein a width between a right window and a left window in said plurality of cover frames is the same as a width between the windows in said base frame but the width of said plurality of cover frame windows gradually decreases relative to the width of pictures of the films, and a cover frame is selected and is joined to the base frame, making it possible to adjust shielding areas on the right and left outer sides of the stereo slide films.

2. A stereo slide mount according to claim 1, wherein said plurality of cover frames are provided with a hinge portion at the center between the right and the left so that it can be freely folded.

3. A stereo slide mount according to claim 1 or 2, further comprising transparent films or transparent glasses stuck to right and left windows of a plurality of masking-amount guide devices frames and have a plurality of window widths, and a collimation pattern is printed at the same position of the right and left windows.

4. A stereo slide mount according to claim 3, wherein said collimation pattern includes a plurality of vertical lines.

5. A stereo slide mount for mounting a stereo slide film photographed by using a stereo camera said stereo slide mount comprising a base frame having two rectangular windows arranged in parallel and a cover frame having two rectangular windows arranged in parallel, positioning pins provided on the film-mounting surface of said base frame to bring the pictures of two pieces of slide films into agreement with the windows upon engagement with perforations of the slide films that are to be fixed, holes corresponding to said positioning pins are formed in the film-holding surface of said cover frame, and said positioning pins are fitted to said holes in order to join said base frame and said cover frame together, wherein a plurality of framing masks are prepared each having a rectangular window at the center thereof and having engaging holes that engage with the positioning pins of said base frame and having a positional relationship between said engaging holes and a vertical side of the windows which is the same as a positional relationship between a film perforation and a vertical side on the inside of the picture of the stereo slide film, and each of said plurality of framing masks having respective widths of window which becomes gradually smaller than the width of the picture of the slide film, and wherein a respective framing mask is selected and is overlapped on the slide films on said base frame, and the cover frame is fitted to the base frame, making it possible to adjust shielding areas on right and left outer sides of the stereo slide films.

6. A stereo slide mount according to claim 5, wherein said cover frame is provided with a hinge portion at the center between the right and the left so that it can be freely folded.

7. A stereo slide mount according to claim 5 further comprising transparent films or transparent glasses stuck to right and left windows of a plurality of masking-amount guide devices that have the same shapes as the cover frame and have a plurality of window widths, and a collimation pattern is printed at the same position of the right and left windows.

* * * * *